US008521956B2

(12) United States Patent
Della Pia et al.

(10) Patent No.: US 8,521,956 B2
(45) Date of Patent: Aug. 27, 2013

(54) WIRELESS MEMORY CARD AND METHOD THEREOF

(75) Inventors: Marcello Della Pia, Guangzhou (CN); Paolo Mastrostefano, Ancova (IT); Marco Mora, Guangzhou (CN)

(73) Assignees: Semiconductor Manufacturing International (Shanghai) Corporation, Shanghai (CN); Semiconductor Manufacturing International (Beijing) Corporation, Beijing (CN)

( * ) Notice: Subject to any disclaimer, the term of this patent is extended or adjusted under 35 U.S.C. 154(b) by 492 days.

(21) Appl. No.: 12/857,513

(22) Filed: Aug. 16, 2010

(65) Prior Publication Data

US 2011/0066777 A1    Mar. 17, 2011

(30) Foreign Application Priority Data

Sep. 11, 2009 (CN) .......................... 2009 1 0195632

(51) Int. Cl.
*G06F 13/00* (2006.01)

(52) U.S. Cl.
USPC .................................. 711/115; 711/E12.008

(58) Field of Classification Search
USPC .......................................... 711/115, E12.008
See application file for complete search history.

(56) References Cited

U.S. PATENT DOCUMENTS

| | | | | |
|---|---|---|---|---|
| 4,581,716 A * | 4/1986 | Kamiya | .......................... | 345/156 |
| 5,777,903 A * | 7/1998 | Piosenka et al. | .............. | 708/100 |
| 7,509,487 B2 * | 3/2009 | Lu et al. | ......................... | 713/151 |
| 7,971,053 B2 * | 6/2011 | Norton et al. | .................. | 713/153 |
| 2004/0050930 A1 * | 3/2004 | Rowe | ............................. | 235/380 |
| 2005/0170779 A1 * | 8/2005 | Tangonan et al. | ............ | 455/66.1 |
| 2009/0173795 A1 * | 7/2009 | Ochi et al. | ..................... | 235/493 |
| 2010/0046439 A1 * | 2/2010 | Chen et al. | ..................... | 370/329 |
| 2012/0200462 A1 * | 8/2012 | Rao et al. | ............... | 343/700 MS |

* cited by examiner

*Primary Examiner* — Creighton Smith
(74) *Attorney, Agent, or Firm* — Kilpatrick Townsend & Stockton LLP

(57) ABSTRACT

A wireless memory card device includes a casing having a width, a length, and a thickness for supporting an integrated power supply. The device has one or more solar cell modules spatially disposed on a first portion of the casing. The device further includes a power supply control circuitry coupled to the one or more solar cell modules for providing regulated voltages to the device. In addition, the device includes a flash memory module provided in a second portion of the casing and a wireless communication module provided on a third portion of the casing. The device further includes one or more antennas coupled to the wireless communication module for transmitting and receiving data packets to and from a host system. The device additionally includes a power-on switch and an indicator signal for indicating the wireless data transfer between the device and the host system.

20 Claims, 5 Drawing Sheets

WIRELESS MEMORY CARD AND METHOD THEREOF

CROSS-REFERENCES TO RELATED APPLICATIONS

This application claims priority to Chinese Application No. 200910195632.7, filed on Sep. 11, 2009, and entitled "Portable Memory Card and Method Thereof," commonly assigned, the disclosure of which is incorporated herein by reference for all purposes.

BACKGROUND OF THE INVENTION

The present invention is directed to computer hardware and software. In particular, the invention is directed to methods and systems of a portable memory card device having wireless capabilities for interfacing with a host computing system. More particularly, the invention provides methods and systems of a portable memory card device being powered by light or solar energy and having flash memory and wireless communication capabilities. In order for the memory card device to be carried conveniently, the card device must be light, thin, and small and can communicate with a host computing system wirelessly.

Computing technologies have proliferated over the years. In the early days, large mainframe computers dominated the computing landscape. These large mainframe computers were developed by companies such as IBM Corporation of Armonk, N.Y. Mainframe computers have been replaced, at least in part, by smaller computing devices, such as minicomputers and personal computers, commonly known as "PCs." PCs come in various shapes and sizes. PCs are often run using computer operating systems software such as Windows of Microsoft Corporation in Redmond, Wash. Other types of computer software come from Apple of Cupertino, Calif. Other types of PCs include larger desktop versions. Smaller PC versions are known as laptop computers, Tablet PCs, and "netbooks." Still other versions of PCs can be found in even smaller devices such as personal digital assistants (PDAs), cellular phones, Smart Phones, and a variety of other forms.

All of these computing devices generally require some types of external memory devices to exchange information between the computing devices and other applications. As merely an example, external memory included magnetic media provided on sheets of semi-flexible materials covered with layers of ferromagnetic materials. Such external memory was often called "Floppy Disks" or the like. As the demand for more memory increased, floppy disks were soon replaced, at least in part, by hard plastic members with optical encoding on them. These hard plastic members were also configured in a disk like shape. As such, they were often called compact disk read only memories (CD ROMs) or more recently digital versatile disks (DVDs) or the like. Although these types of disks have had much success, limitations also exist.

As merely an example, floppy disks, besides their limited capacity, are unreliable and prone to damage. Floppy disks deteriorate with use. Dusty conditions, heat, or proximity to magnetic fields can all easily damage the disk. Sometimes a floppy disk that works in one computer will not work in another because the read/write heads in floppy drives can become worn, dirty, or misaligned, making a disk that is readable in one drive unreadable in another. CD ROMs are capable of higher capacities, but are slower than floppy disks in term of average random access time. CD ROMs lately are being replaced by solid state memory devices such as flash memory devices or flash memory for short. Flash memory (both NOR and NAND types) offers fast read access time and is extremely durable. Flash memory exists in many physical forms including MultiMediaCard (MMC), Secure Digital (SD), Memory Stick, xD-Picture Card, RS-MMC, miniSD and microSD, all featuring extremely small form factors. For example, the microSD card has an area of just over 1.5 cm$^2$, with a thickness of less than 1 mm microSD capacities range from 64 MB to 32 GB, as of March 2010. An example of a flash memory stick is illustrated by way of FIG. 1.

As shown, FIG. 1 is a simplified illustration of a flash memory stick 100. The flash memory stick includes flash memory, such as one or more NAND flash devices. A small controller is coupled to the NAND flash device to allow communication between the NAND flash device and a computing device, such a personal computer, laptop computer, or others. In conventional applications, the flash memory stick is inserted into a serial port, such as a universal serial port, commonly called USB, to allow information to be exchanged between the flash memory stick and the computing device. Unfortunately, certain limitations exist with these flash memory sticks. Conventional flash memory sticks are often easy to carry but also prone to loss and damage. Additionally, flash memory sticks can be subjected to security violations since they are not secure in any manner. Although highly successful, these flash memory sticks can still be improved.

From the above, it is seen that an improved technique for external memory device(s) is desired.

BRIEF SUMMARY OF THE INVENTION

Various embodiments of the present invention provide methods and techniques for interfacing with a memory card. In particular, the invention provides a method and system for a portable memory device having wireless capabilities. More particularly, the invention provides a method and system for a portable memory device having non-volatile memory, such as flash memory, to store data and program instruction codes. The portable device includes a wireless communication module that enables the flash memory to receive and store data and program codes from a host computing system. The portable device further includes a solar power supply source that is configured to provide energy to the portable memory device. Merely by way of example, the portable memory device can be provided on a wearable casing or housing having a physical size of a credit card or name card, but it would be recognized that the invention has a much broader range of applicability. For example, the invention can be applied to other computing and/or portable memory devices.

In an embodiment, the present invention provides a portable (e.g., wearable, hand-held) memory card device that can wirelessly communicate with a host computer. The device has a portable member having a width, a length, and a thickness. The device has one or more solar cell modules spatially disposed on a first portion of the portable member. The device further has a flash memory module provided on a second portion of the portable member and a wireless communication module provided on a third portion of the portable member. The wireless communication module is electrically coupled to the flash memory module. The device also includes a power supply control circuit that is coupled to the one or more solar cell modules and configured to provide voltage supplies to the flash memory module and the wireless communication module.

In another embodiment, the present invention provides a method of using a portable memory card device to wirelessly communicating with a host computer. The method includes providing a portable member having a width, a length, and a thickness. In a specific embodiment, the portable member has one or more solar cell modules spatially disposed on a first portion of the portable member. In a specific embodiment, the one or more solar cell modules are configured in an array arrangement. The device has a flash memory module provided on a second portion of the portable member. In a specific embodiment, the flash memory module is a NAND-type flash memory module. The device has a wireless communication module provided on a third portion of the portable member. In an embodiment, the wireless communication device is coupled with the flash memory module through a processor circuit. In a preferred embodiment, the method includes exposing the one or more solar cell modules to a light source. The method further includes switching on the device by means of a switch. Additionally, the method includes initiating a wireless data communication between the memory device and the host computer. In a specific embodiment, the method also includes indicating the data communication by means of an indication signal.

In yet another embodiment, the present invention provides a method of data transfer between a solar-powered wireless memory card device with a host system. The method includes providing and exposing the memory card device to a light source. The method further includes switching on the memory card device and selecting a data transfer rate according to a given condition. The given condition may be one of the available intensity of the light source, the quantity of data that needs to be transferred, the distance between the memory card device and the host system, or interference in the wireless channel. Additionally, the method includes determining whether the data transfer is complete.

Many benefits are achieved by way of the present invention over conventional techniques. For example, the present technique provides an easy to use device that relies upon conventional technology. In certain embodiments, the method and device can provide a higher security than conventional flash memory sticks. Additionally, the method and device are compatible with conventional process and computing technology without substantial modifications. In a preferred embodiment, the invention can also be operable without an external wired power source. Depending upon the embodiment, one or more of these benefits may be achieved. These and other benefits will be described in more detail throughout the present specification and more particularly below.

Other embodiments and advantages of the present invention are apparent from the following detailed description, taken together with the accompanying drawings, illustrating by way of example the principles of the invention.

DETAILED DESCRIPTION OF THE INVENTION

According to embodiments of the present invention, techniques directed to computer hardware and software are provided. In particular, the invention provides a method and system for a portable memory device having wireless capabilities. More particularly, the invention provides a method and system for a portable memory device using non-volatile memory, commonly called Flash Memory, in combination with at least wireless capabilities. Merely by way of example, the portable member can be provided on a portable card, credit card, or name card, but it would be recognized that the invention has a much broader range of applicability. For example, the invention can be applied to other computing and/or portable memory devices.

Figure 1:
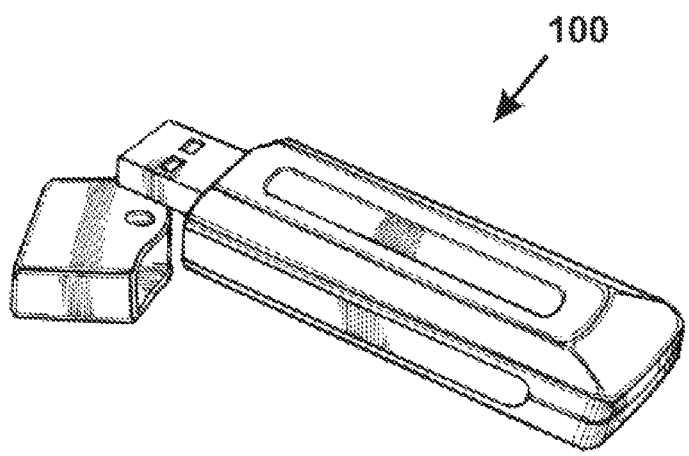
FIG. 1 is an illustration of a conventional flash memory device.
Figure 2:
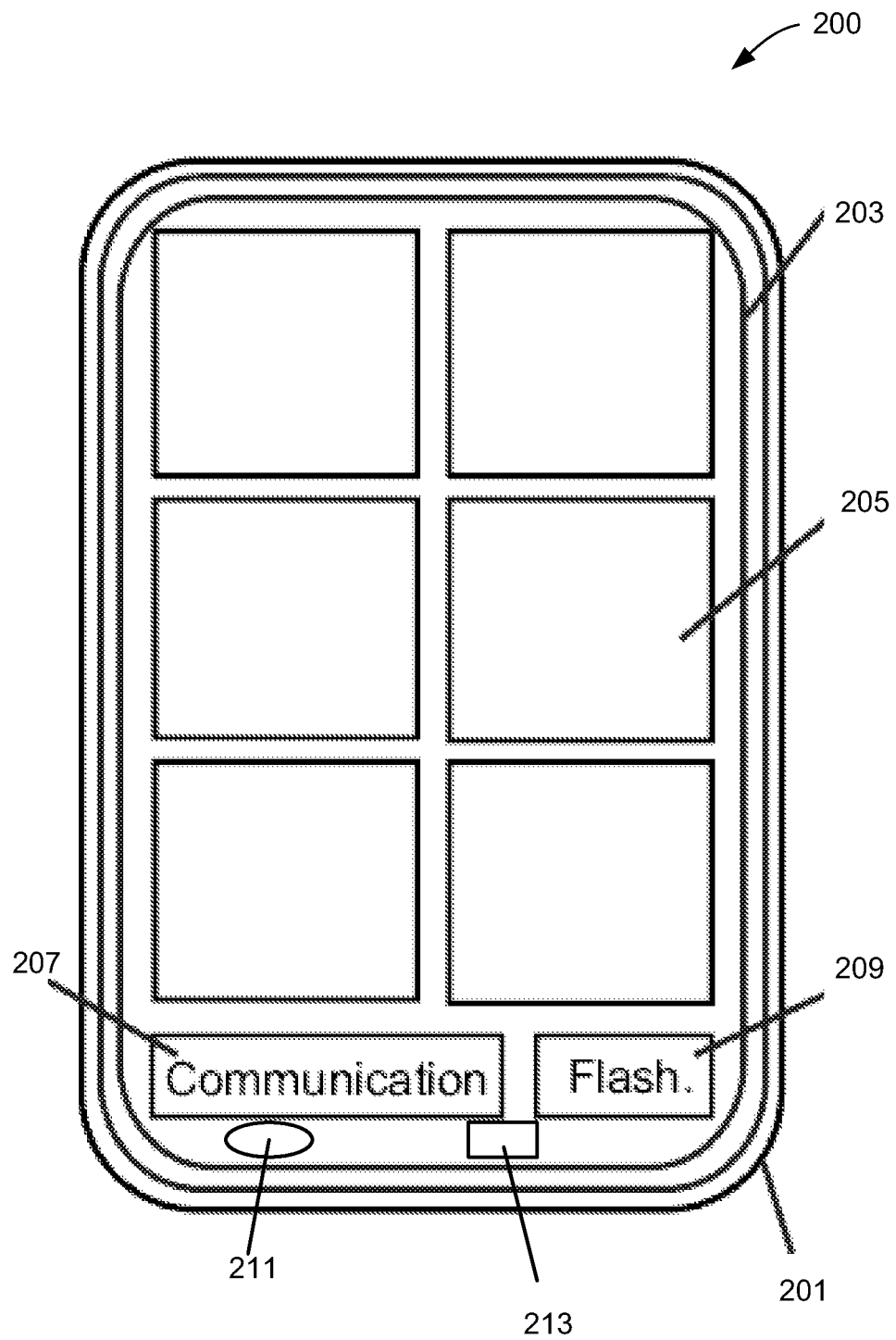
FIG. 2 is a simplified block diagram of a portable flash memory card device according to an embodiment of the present invention.

FIG. 2 is a simplified block diagram of a memory card device 200 according to an embodiment of the present invention. This diagram is merely an example, which should not unduly limit the scope of the claims herein. One of ordinary skill in the art would recognize other variations, modifications, and alternatives. In an embodiment, the card device 200 can be hand-held, portable or wearable, i.e., a user can wear it in his wallet/her purse or in his/her pocket. The device has a casing 201 having a width, a length, and a thickness. In a specific embodiment, the device is similar in size and shape to a credit card. That is, the card has a thickness of 1.5 millimeters and less, and a length and width of about 10 centimeters by about 6 centimeters and less according to a specific embodiment. In an embodiment, the casing (or housing) can be plastic sealed (e.g., polymeric member) and can have a laminated structure providing support to one or more solar cell modules 205 spatially disposed on a first portion of the casing. The one or more solar cell modules 205 constitute a power source for the card device. In a specific embodiment, the solar modules can be silicon based and/or made of thin film technologies. In a specific embodiment, the solar modules can be mounted in a flat surface and disposed in an array arrangement to save space. The solar modules can be electrically connected in series and/or in parallel. The solar modules can be mounted flatly on a first portion of the casing. Hereinafter, the term casing is used synonymously with housing to define a mechanical structure that carries the one or more solar modules and other components. In a specific embodiment, the solar module area can be 24 millimeters square and/or six cells each having a 2 centimeters by 2 centimeters area. In a specific embodiment, the solar module(s) can generate about 0.3 to about 0.4 watts and more. Of course, there can be other variations, modifications, and alternatives.

The solar power source further includes electronic power supply control circuit (not shown) coupled to the one or more solar modules and being configured to regulate the voltage(s) to be supplied to other electronic components. A rechargeable battery or high-density capacitor (not shown) stores the regulated voltage(s) for supplying the electric power required by the memory card device.

The card device includes a flash memory module 209 provided on a second portion of the casing. In a specific embodiment, the second portion can include an area of about sixteen by seven millimeters square or slightly more or less. The flash memory device can be 4, 8, 16 Gigabits or larger according to specific embodiments. In preferred embodiments, the memory is 16 Gigabit and larger. The flash memory device may use a NAND-type or NOR-type design. In a specific embodiment, power consumption of the flash memory device can be about 0.12 Watts and less. Of course, there can be other variations, modifications, and alternatives.

In a specific embodiment, the device may include a wireless communication module 207 provided on a third portion of the casing. The wireless communication module may be coupled with the flash memory module through a signal processing module (not shown). The wireless communication module may include the signal processing module or a controller, but can also be configured in other ways. The controller and the wireless communication module can consume about 0.2 Watts and less according to a specific embodiment. In an embodiment, the wireless communication module may include a wireless LAN (WLAN) chip set based on the IEEE 802.11 a/b/g/n standards, which then enables the card device to communicate with a variety of other devices, such as computers, printers, handhelds, mobile phones, smart phones, headsets, and others. In another embodiment, the wireless communication module may support the Bluetooth communication protocol. The inventors have conducted several wireless communication experiments by sending and receiving data packets between the memory card and a host computing system and measured the energy needed to send and receive a data bit. The experimental data has shown that the energy for sending or receiving a data bit is about 300 nJ ($10^{-9}$ Joules) per bit and less for both the IEEE 802.11 a/b/g/n standards (wireless local area network or WLAN) or the Bluetooth standard (personal area network or PAN). In other words, the energy required for sending data packets is similar whether the transmission occurs a high bit rate or a low bit rate in certain embodiments. That means, although the power consumption is higher when sending or receiving data packets at high data rates than at low data rates, however, the time required to complete the transmission is shorter so that the energy per bit sent or received is about the same between IEEE 802.11 standards and Bluetooth protocol. While the energy consumed per bit is similar between the IEEE 802.11 and Bluetooth, the standby current for high data rate protocol (e.g., IEEE 802.11) is about 10 times higher than that of Bluetooth. Thus, the use of the one or the other standards (WLAN or PAN) can be more beneficial depending on applications.

Shown in FIG. 2, the card device may include a high efficiency loop antenna 203, which is coupled to the wireless communication module. The antenna may be conveniently disposed around a vicinity of a peripheral region of the device. In another embodiment, the antenna can be a chip antenna having a width, a length, and thickness according to specific embodiments. In yet another embodiment, the card device may include two antennas such as a loop antenna and a chip antenna for space diversity to improve the quality and reliability of the wireless communication link by mitigating the multipath issues. In a specific embodiment, the loop antenna may also operate as an energy source to power a portion of the card electronics by collecting energy from an external loop antenna via incident high frequency electromagnetic energy. Of course, there can be other variations, modifications, and alternatives. Further details of the card device can be found throughout the present specification and more particularly below.

The card device further includes a switch 211 for activating the memory card device. Switch 211 may be an electronic toggle switch or a mechanical toggle switch found in electronic pocket calculators. Switch 211 may be activated manually by a user or it can be activated automatically by the energy collected by the loop antenna 203 when the collected energy exceeds a predetermined level. The memory card device additionally includes a signal indicator 213 for indicating the operating status of the card device. In an embodiment, signal indicator 213 can remain continuously on to indicate that the card device is activated. In other embodiments, signal indicator 213 can flash or blink in the rhythm of the data packets communication with a host computing system. Signal indicator can be a light emitting diode (LED) in certain embodiments. Of course, there can be other variations, modifications, and alternatives.

Figure 3:
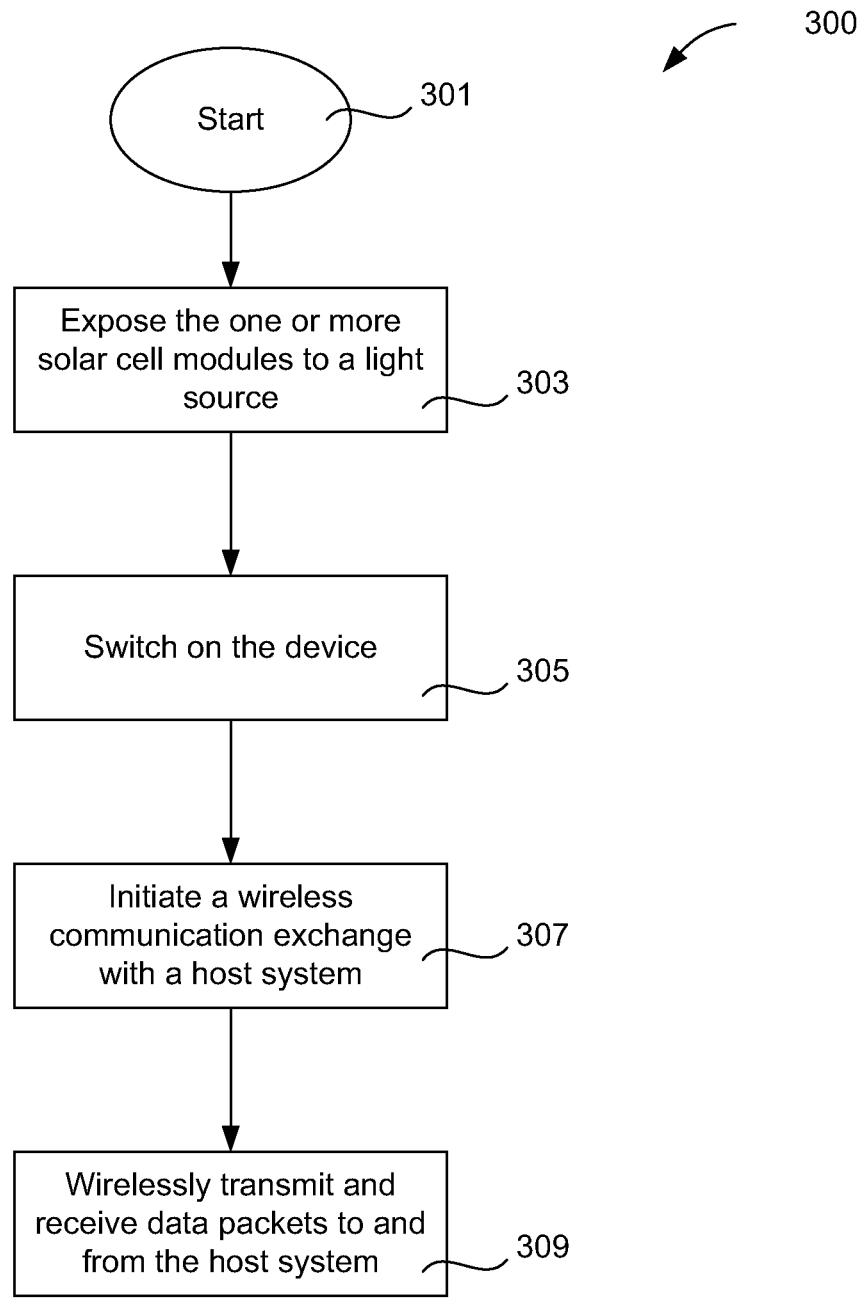
FIG. 3 is a simplified diagram illustrating a method of using a portable flash memory device according to an embodiment of the present invention.

FIG. 3 is a simplified process diagram illustrating a method 300 of using a wireless memory card device according to an embodiment of the present invention. This diagram is merely an example, which should not unduly limit the scope of the claims herein. One of ordinary skill in the art would recognize other variations, modifications, and alternatives. The card device may have features shown in FIG. 2 and described above. The method starts at step 301 where the user may pull out the wireless memory card out of his wallet or her purse. At step 303, the memory card device having the one or more solar cell modules mounted flat on a portion of the casing is exposed to a light source for generating electric energy. In the description hereinafter, the term casing or housing will be used alternatively, meaning a mechanical member that provides support to the solar modules, the flash memory module, the communication module, the antenna, and other electronic components. At step 305, the card device is turned on, for example, by activating the electronic switch 210. A controller circuit then initiates a wireless communication exchange with a host system (step 307). In an embodiment, the host system can be one of the desktop computer, laptop computer, printer, digital camera, cell phones, music players, each of them is equipped with a wireless communication module and running commercially available or proprietary software, which can be interpreted or decoded by a controller or processor circuit of the memory card. Once the communication link is established between the card device and the host system, data packets can be transmitted and received between both the card device and the host system at step 309.

Figure 4:
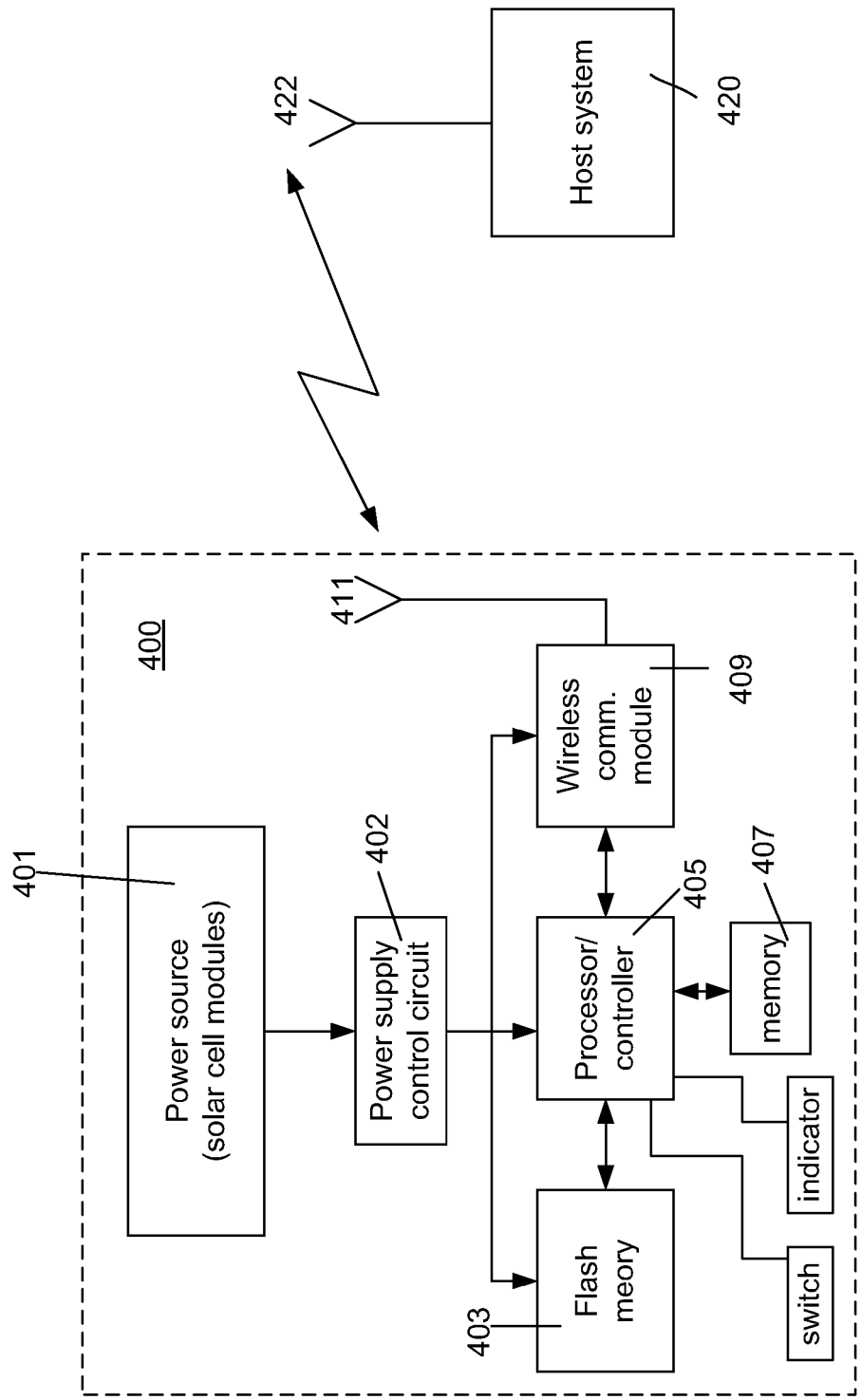
FIG. 4 is a simplified diagram of a portable flash memory device according to an embodiment of the present invention.

FIG. 4 is a simplified block diagram of a portable/wearable memory card device 400 according to an embodiment of the present invention. This diagram is merely an example, which should not unduly limit the scope of the claims herein. One of ordinary skill in the art would recognize other variations, modifications, and alternatives. As shown in FIG. 4, the memory card device 400 can wirelessly communicate with a host computing device 420. In an exemplary embodiment, the memory card device 400 is a flash memory card that is portable or wearable (i.e., can be carried in a pocket, purse or a wallet) and configured to store data and program instructions. The memory card device 400 includes a flash memory that may comprise multiple flash memory chips that can be a NAND or NOR type. In an embodiment, the flash memory may include one of the flash memory module such as Multi-MediaCard, Secure Digital, MiniSD, MicroSD, Memory Stick and others. The card device may include a power source 401 disposed in a first portion of the flash memory device. In a specific embodiment, the power source can include one or more solar modules 401 and a power supply control circuit 402. The card device has a wireless communication module 409 configured to communicate with the host system 420 wirelessly. In addition, the card device may include a microcontroller or a processor 405 configured to interface between the flash memory and the first wireless communication module.

Host computing device 420 may include a second wireless module (not shown) coupled to an antenna 422 and being configured to communicatively transmit and receive data packets to and from the card device 400.

As shown in FIG. 2, the wireless communication module 409 is provided on a third portion of the flash memory device.

The wireless communication module 409 is coupled with the flash memory module 403 via a processor or controller 405. In an embodiment, the wireless module 409 may include the controller 405 in a single integrated circuit such as a system-on-chip (SOC). Such controller and wireless device can consume about 0.2 Watts and less according to a specific embodiment. In an embodiment, the wireless module may use a suitable technique such as Bluetooth® wireless networking technology. In another embodiment, the wireless module can be a WLAN module as the IEEE 802.11 standards are ubiquitous and mature. The flash memory device can thus interface with a variety of other host devices 420, such as computers, printers, handhelds, music players, smart phones, headsets, and mobile phones within a certain physical range. In yet another embodiment, wireless module 409 can be a UWB (Ultra Wide band) module. Of course, there can be other variations, modifications, and alternatives.

Although many wireless technologies such as Bluetooth, Wi-Fi, UWB, and others use unlicensed frequency bands, i.e., the frequency bands can be used without paying license fee to the government, the wireless modules must still conform to the Federal Communication Commission (FCC) regulations. To address these issues, the present invention will provide a memory card device with an embedded wireless module such as a system on a chip (SOC) that is inherently robust and energy-efficient and FCC certified. In an embodiment of the present invention, the only required software will be a device driver that can be wirelessly stored in a portion of the flash memory module depending on specific applications.

In certain embodiments, the wireless module 409 may combine the SOC, a portion of power control circuit 402, and all radio frequency (RF) components including an RF amplifier and even an antenna. In other embodiments, the flash memory device includes a high efficiency loop antenna 411, which is coupled to the wireless module 409. Antenna 411 may be a suitable conductive member that is disposed around a vicinity of a peripheral region of the housing of the flash memory device 400 in a specific embodiment. Antenna 411 has a width, a length, and a thickness according to a specific embodiment. The antenna is formed overlying an insulating material, and is exposed to receive and/or transmit wireless signals in a specific embodiment. Of course, there can be other variations, modifications, and alternatives.

In an alternative specific embodiment, the present invention provides a method of using a portable memory card device, which can wirelessly and automatically communicate with a host computing system. The method is outlined as follows:

1. Provide a portable member having a width, a length, and a thickness (e.g., the device has one or more solar cell modules spatially disposed on a first portion of the portable member. In an embodiment, the one or more solar cell modules are coupled to a power supply control module configured to provide voltage supply to the memory device. The device has a flash memory module provided on a second portion of the portable member. The device has a wireless communication module provided on a third portion of the portable member. In an embodiment, the wireless communication module is electrically coupled with the flash memory module through a controller or processor circuit. The wireless communication module is coupled to an antenna;
2. Expose the one or more solar cell modules to a light source for producing electric current to charge a built-in battery;
3. Initiate the device when the voltage of the built-in battery reaches a predetermined level;
4. Select a data transfer rate based on an operation requirement. In certain embodiments, the operation requirement may be determined by the intensity of the available light source, or it can be determined by the wireless protocols of the host system, or by the proximity of the host system, or interference in the communication channel;
5. Transfer data between the device and the host computing system;
6. Determine if transfer has been completed; and
7. Perform other steps, as desired.

The above sequence of steps provides methods according to an embodiment of the present invention. As shown, the method uses a combination of steps including a way of transferring data between a solar powered wireless memory device and a host computing device according to an embodiment of the present invention. Many other methods and system are also included. Of course, other alternatives can also be provided where steps are added, one or more steps are removed or repeated, or one or more steps are provided in a different sequence without departing from the scope of the claims herein. Additionally, the various methods can be implemented using a computer code or codes in software, firmware, hardware, or any combination of those. Depending upon embodiments, there can be other variations, modifications, and alternatives. Further details of the present method can be found throughout the present specification and more particularly below.

Figure 5:
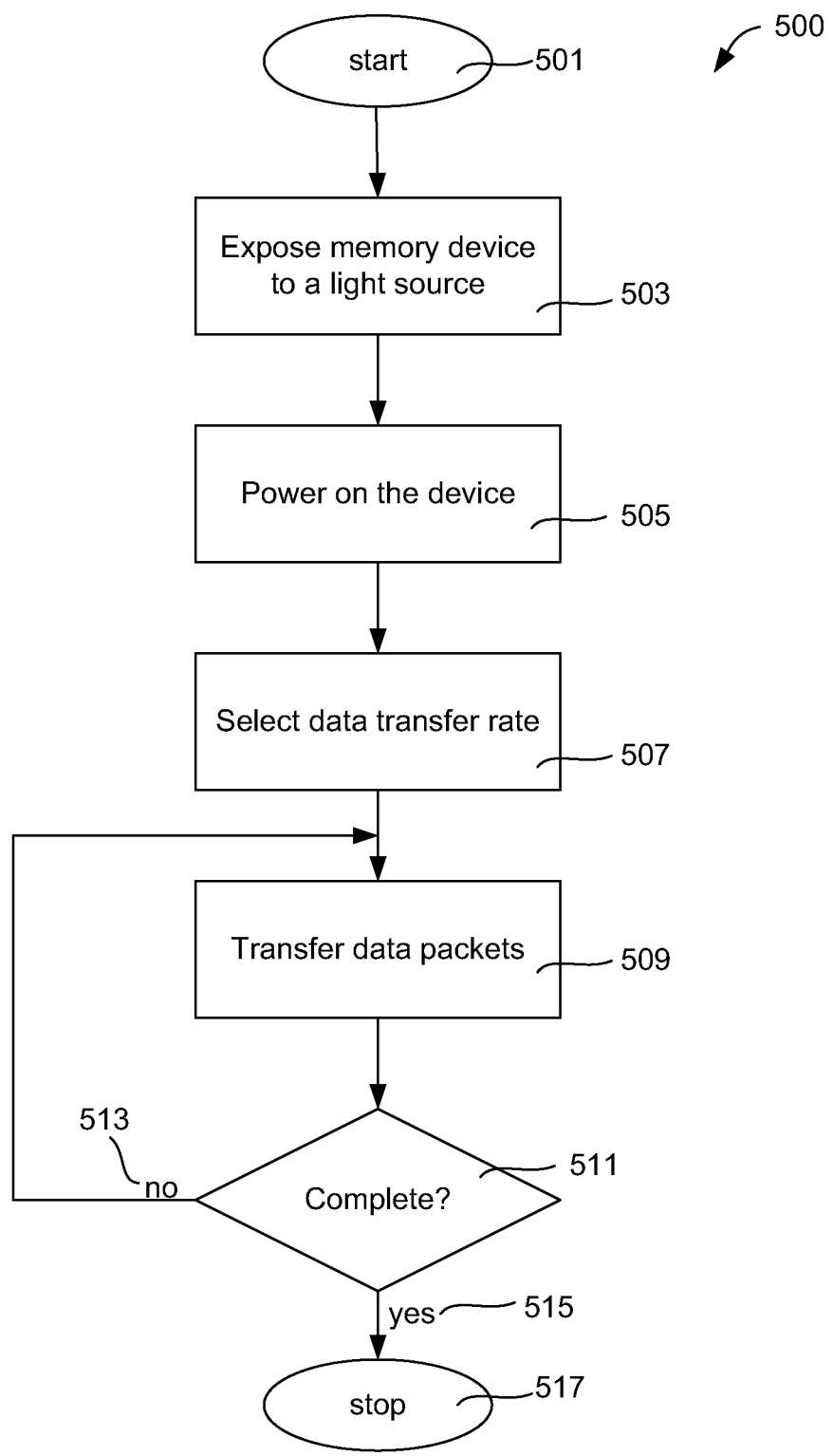
FIG. 5 is a simplified flowchart of an alternative method of using a portable flash memory device for wireless data transfer to a host system according to an embodiment of the present invention.

FIG. 5 is a simplified flowchart of an alternative method 500 of using a solar-powered portable flash memory device to transfer data to a host system according to an embodiment of the present invention. This flowchart is merely an example, which should not unduly limit the scope of the claims herein. One of ordinary skill in the art would recognize other variations, modifications, and alternatives. As shown, the present invention provides a method of using a portable memory card device, which begins at start, step 501. Of course, there can be other variations, modifications, and alternatives.

In a specific embodiment, the present method includes exposing (step 503) a portable member having a width, a length, and a thickness to a light source. In a specific embodiment, the device has one or more solar cell modules spatially disposed on a first portion of the portable member. In a specific embodiment, the one or more solar cell modules have a first output terminal and a second output terminal. The device has a flash memory module provided on a second portion of the portable member. The device has a wireless communication module provided on a third portion of the portable member. In an embodiment, the wireless communication module is coupled to the flash memory module. In an embodiment, the wireless communication module is a system on a chip (SOC) that includes a proprietary processor circuit, power control circuitry, RF components, and firmware and/or software module. In an embodiment, the device includes one or more antennas and is an out-of-the-box hardware/software package, carrying FCC and Wi-Fi certifications.

As shown in FIG. 5, the method includes powering on (step 505) the solar wireless memory device. The powering-on can be activated manually by a user or automatically using the built-in loop antenna as an activator. In an embodiment, the loop antenna may function as an energy collector of incident high-frequency electromagnetic radiation and is coupled to a capacitor and a threshold detector. In the event that the capacitor reaches a predetermined energy or voltage level, the power on switch will be activated. A step 507, the method includes select a transferring data for transfer data packets between the memory device and the host system. In an embodiment, the data transfer is performed under the control of the proprietary processor circuit executing IEEE 802.11g/n protocol stacks. The processor circuit also includes program and instruction codes that perform a baseband (e.g., MAC layer) and higher layers (TCP/IP) functions. In order to minimize power consumption, the device may lower the clock rates during time intervals between data packet transfers. In certain embodiments, the device may reduce the transfer data rates to reduce power consumption. For example, if the amount of data to be transferred is small, or the light source is dim, or the distance between the device and the host system is large, or there is interference, then the device can select an appropriate packet transfer rate to accommodate the situation. Of course, there can be other variations, modifications, and alternatives.

In a specific embodiment, the present invention includes determining if transfer has been completed (step 511). If not, the method continues via branch 513 to step 509 according to a specific embodiment. If transfer has been completed, the method continues via branch 515 to step 517, which completes the data transfer and sets the device in a sleep mode or idle mode. In certain embodiments, the device may consumes 10 μW (microwatt) and less when in a sleep mode. In a specific embodiment, the solar module can generate power that is stored in a battery in the device or capacitor also in the device. That is, the solar modules would be coupled to an energy storage device, which provides power to the flash memory device, controller, and other electronic devices. In a specific embodiment, the present method can also perform other steps, as desired. Of course, there can be other variations, modifications, and alternatives.

The above sequence of steps provides a method of using a light-powered wireless memory card for data transfer with a host system according to an embodiment of the present invention. As shown, the method uses a combination of steps including a way of transferring data between a solar powered wireless device and a computing device according to an embodiment of the present invention. Many other methods and system are also included. Of course, other alternatives can also be provided where steps are added, one or more steps are removed or repeated, or one or more steps are provided in a different sequence without departing from the scope of the claims herein. Additionally, the various methods can be implemented using a computer code or codes in software, firmware, hardware, or any combination of these. Depending upon the embodiment, there can be other variations, modifications, and alternatives.

Although the invention has been discussed with respect to specific embodiments thereof, these embodiments are merely illustrative, and not restrictive, of the invention. Furthermore, the device architecture discussed above is for the purposes of illustration. The invention can be implemented in numerous different forms including within stand-alone wireless communication modules; as module integrated with microcontroller and memory, and integrated with wireless protocol interface hardware and software. Furthermore, although the invention has been discussed with reference to the IEEE 802.11 standards or the Bluetooth standards or the UWB standards, embodiments of the invention are equally applicable to any other wireless protocols that allow sending and receiving data packets to and from the host computing system. Thus, the scope of the invention is to be determined solely by the claims. It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A memory card system comprising:
   a casing having a width, a length, and a thickness;
   one or more solar cell modules spatially disposed on a first portion of the casing;
   a power supply control circuitry coupled to the one or more solar cell modules and being configured to provide power to the memory card system;
   a flash memory module provided on a second portion of the casing;
   a wireless communication module provided on a third portion of the casing, the wireless communication module being communicative with a host system;
   a controller interposed between the flash memory module and the wireless communication module, the controller being configured to communicate data between the flash memory module and the wireless communication module; and
   an indicator signal for signaling the transmission and reception of data packets between the wireless communication module and the host system.

2. The card system of claim 1 wherein the wireless communication module comprises a WLAN protocol.

3. The card system of claim 1 further comprising one or more antennas coupled to the wireless communication module and being configured to wirelessly transmit and receive data packets from a host system.

4. The card system of claim 1 further comprises a switch for powering on the card system.

5. The card device of claim 1 further comprising a rechargeable battery.

6. The card device of claim 1 wherein the wireless communication module and the flash memory module are sealed within one or more portions of the casing.

7. The card device of claim 1 wherein the controller decodes and executes program codes embedded in received data packets.

8. The card device of claim 1 wherein the length of the casing is about 10 centimeters and less and the width is about 6 centimeters and less.

9. The card device of claim 1 wherein the one or more solar cell devices are configured in an array arrangement.

10. A method of using a wireless memory card device powered by solar energy to communicate data packets with a host system wherein the memory card device includes a wireless communication module and a memory module, the method comprising:
    exposing the card device having one or more solar cell modules mounted flat on a casing to a light source;
    switching on the card device;
    initiating a communication exchange with the host system using a wireless protocol; and
    transmitting and receiving data packets to and from the host system;
    wherein switching on the device comprises determining whether a built-in battery has reached a predetermined threshold level.

11. The method of claim 10 wherein the wireless protocol uses one of the IEEE 802.11 standards.

12. The method of claim 10 wherein the switching on the device comprises activating a switch.

13. The method of claim 10 wherein the exposing the device to the light source comprising charging a rechargeable battery.

14. The method of claim 13 wherein the charging a rechargeable battery comprises regulating a voltage using a power supply control circuit.

15. The method of claim 10 wherein the casing comprises a polymeric material.

16. The method of claim 10 wherein the device further comprises one or more antennas coupled to the wireless communication module.

17. The method of claim 10 wherein the memory module comprises a flash memory.

18. The method of claim 10 wherein the one or more solar cell devices are configured in an array arrangement.

19. The method of claim 10 further comprising:
   indicating the transmission and reception of data packets using an indicator signal.

20. The card device of claim 1 wherein the casing comprises a polymeric material.

\* \* \* \* \*